United States Patent [19]

Rambach

[11] 4,136,741
[45] Jan. 30, 1979

[54] SOIL CULTIVATING IMPLEMENT

[75] Inventor: Celestin Rambach, Vendeuvre sur Barse, France

[73] Assignee: C. van der Lely N.V., Maasland, Netherlands

[21] Appl. No.: 747,180

[22] Filed: Dec. 3, 1976

[51] Int. Cl.² .................. A01B 33/16; A01B 59/043
[52] U.S. Cl. ............................. 172/47; 172/59; 172/443; 172/677; 280/476 R
[58] Field of Search ................ 172/439, 443, 47, 59, 172/677, 680; 280/476 R

[56] References Cited

U.S. PATENT DOCUMENTS

| | | | |
|---|---|---|---|
| 2,785,614 | 3/1957 | Jensen | 172/443 |
| 3,391,663 | 7/1968 | Cagle | 280/476 R |
| 3,837,677 | 9/1974 | Haskins | 280/476 R |
| 3,899,029 | 12/1975 | Lely | 172/59 |
| 3,931,858 | 1/1976 | North | 172/443 |
| 3,937,460 | 2/1976 | Lely | 172/59 |
| 3,983,943 | 10/1976 | Lely | 172/59 |
| 4,034,687 | 7/1977 | Lely | 172/59 |

Primary Examiner—Richard J. Johnson
Attorney, Agent, or Firm—Mason, Mason and Albright

[57] ABSTRACT

A cultivating implement has an elongated frame portion with a front three point coupling that connects to the three point lift of a conventional tractor. A rear supporting structure for a further implement has spaced apart beams that extend forward to pivots near the lower two points of the front coupling. The structure has interconnected frame beams that are supported on ground wheels and the rear ends of the forwardly extending beams are fixed to vertical frame beams. Rearwardly extending arms are pivoted to the interconnected frame beams and these arms together with coupling plates on an upper tie beam, form a rear three point coupling. The arms are interconnected to the remainder of the structure by adjustable carrier arms. Ground wheels support the structure and a further implement that is connected to the rear coupling.

9 Claims, 3 Drawing Figures

SOIL CULTIVATING IMPLEMENT

Figure 1:
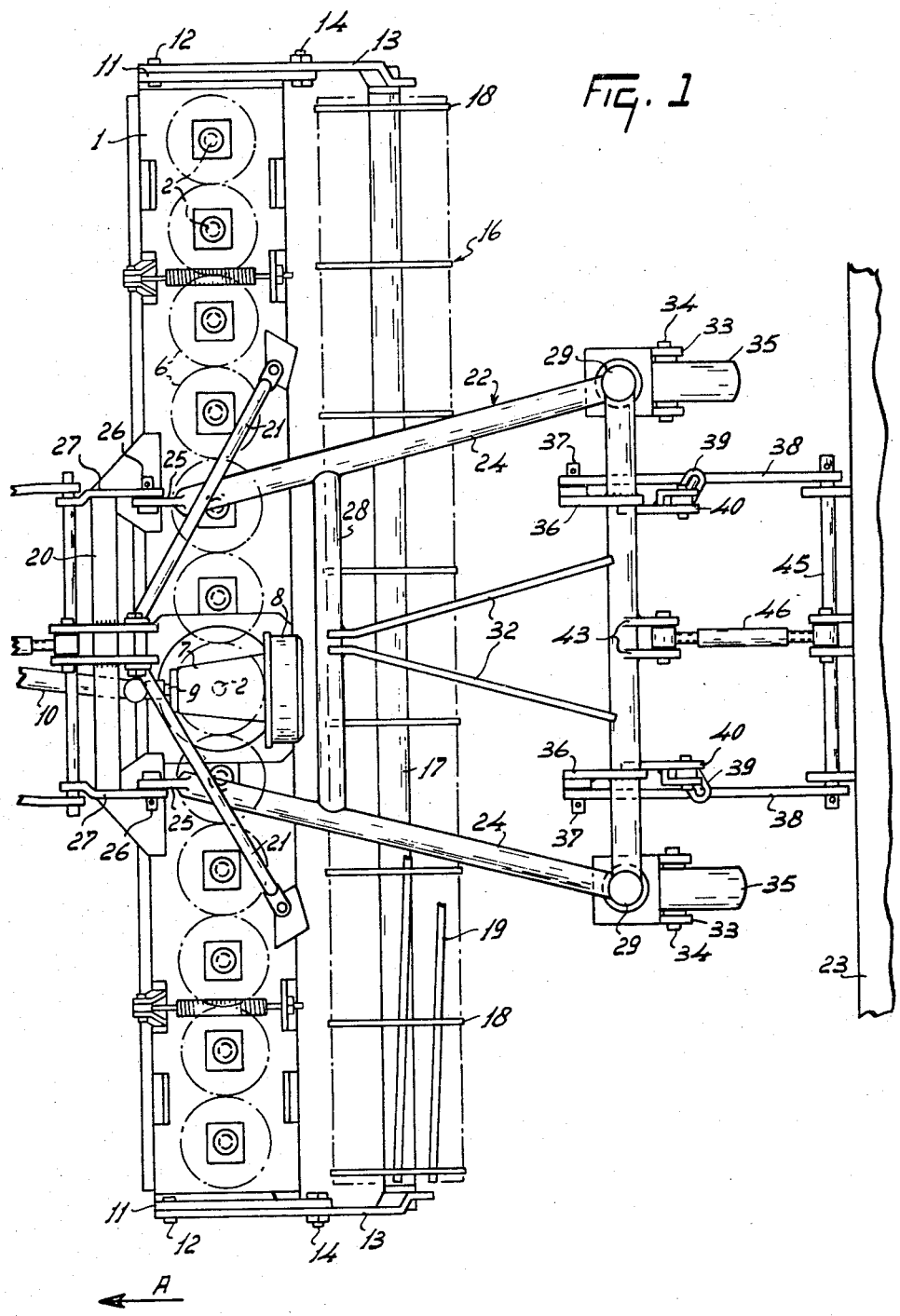
Figure 2:
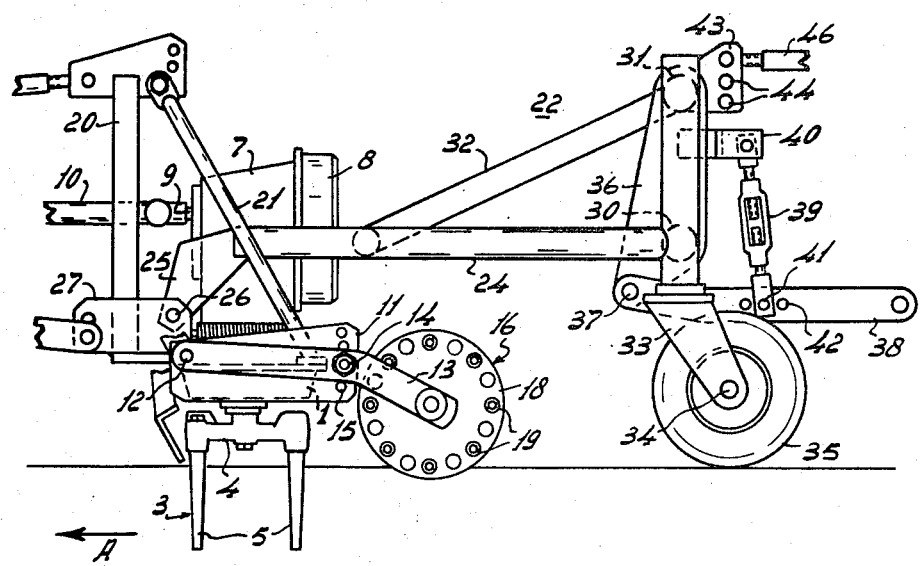
Figure 3:
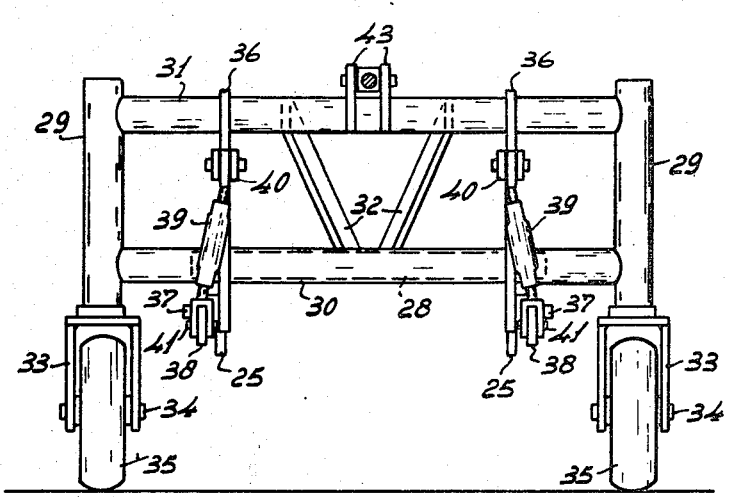

For a better understanding of the invention, and to show how the same may be carried into effect, reference will now be made, by way of example, to the accompanying drawings, in which:

FIG. 1 is a plan view of a soil cultivating implement provided with attachment means in accordance with the invention, the implement being connected to the rear of an agricultural tractor or other operating vehicle, FIG. 2 is a side elevation corresponding to FIG. 1, and FIG. 3 is a rear elevation illustrating substantially only the attachment means of the implement.

Referring to the drawings, the soil cultivating implement that is illustrated therein has a hollow box-shaped frame portion 1 that extends substantially horizontally transverse, and usually substantially horizontally perpendicular, to the intended direction of operative travel of the implement which is indicated in FIGS. 1 and 2 of the drawings by an arrow A. Bearings carried in the upper and lower walls of the hollow frame portion 1 rotatably support a plurality (in this case, 12) of substantially vertical, or at least upwardly extending, shafts 2, the shafts 2 being arranged in a single row that extends perpendicular or substantially perpendicular to the direction A with the axes of rotation of said shafts 2 spaced apart from one another by distances that preferably, but not essentially, have magnitudes of substantially 25 centimeters. Each shaft 2 projects downwardly from beneath the bottom of the hollow frame portion 1 and is there splined or otherwise keyed so as firmly but releasably to receive a hub at the centre of a substantially horizontally disposed tine support 4. The opposite ends of each tine support 4 carry substantially cylindrical sleeve-like tine holders whose axes are substantially parallel to those of the shafts 2 and each holder receives a fastening portion of a corresponding rigid soil working tine 5. The tines 5 have soil working portions that project downwardly from the lower ends of the holders into the soil when the implement is in operation and the soil working portion of each tine 5 preferably, but not essentially, trails rearwardly from top to bottom by a few degrees with respect to the intended direction of operative rotation of the corresponding shaft 2. The supports 4 with their tine holders and tines 5 constitute rotary soil working or cultivating members that are generally indicated by the reference 3 so that, in the case of the example that is being described, there are 12 of the members 3, one at the lowermost end of each of the 12 shafts 2. Each shaft 2 is provided, inside the hollow frame portion 1, with a corresponding straight-toothed or spur-toothed pinion 6, the size and arrangement of the twelve pinions 6 being such that each pinion has its teeth in mesh with those of its immediate neighbor, or those of both of its immediate neighbors, in the single row of pinions. It will be realized that, with this arrangement, each shaft 2 and its soil working or cultivating member 3 will revolve, during the use of the implement, in a direction which is opposite to the direction of rotation of its immediate neighbor in the row or to the directions of rotation of both of its immediate neighbors in the row.

One of the center pair of shafts 2 of the row has an upward extension through the top of the hollow frame portion 1 into a gear box 7 that is fastened in position on top of the frame portion 1. Bevel pinions (not visible) within the gear box 7 place the shaft extension in driven connection with a substantially horizontal shaft (not visible) that extends substantially parallel to the direction A. The rearmost end of the substantially horizontal shaft and the rearmost end of an overlying and parallel substantially horizontal shaft 9 both project through a rear wall of the gear box 7 into a change-speed gear 8 that is fastened to the back of said gear box. It is not necessary to describe the construction of the change-speed gear 8 in detail for purposes of the present invention but, briefly, the ends of the shaft 9 and the underlying and parallel shaft that project into the change-speed gear are both splined for co-operation with the matchingly splined hubs of a chosen pair of one of a number of pairs of co-operating exchangeable and interchangeable straight-toothed or spur-toothed pinions of different sizes. The particular pair of toothed pinions that is chosen, and the arrangement thereof that is adopted relative to the shaft ends that project into the change-speed gear 8, dictates the transmission ratio between the shaft 9 and the underlying and parallel shaft that is not visible in the drawings and thus the speed at which the soil working or cultivating members 3 will be revolved in response to a more or less fixed input speed of rotation that is applied to the leading splined or otherwise keyed end of the shaft 9 that projects forwardly from the front of the gear box 7 in a direction substantially parallel to the direction A. As shown in outline in FIG. 1 of the drawings, the leading end of the shaft 9, which affords a rotary input shaft of the gear box 7, is intended to be placed in driven connection with the power take-off shaft of an agricultural tractor or other operating vehicle through the intermediary of a telescopic transmission shaft 10, that is of a construction which is known per se, having universal joints at its opposite ends.

The opposite ends of the hollow frame portion 1 carry substantially vertically disposed plates 11 that are in parallel relationship with one another and substantially parallel relationship with the direction A, each plate 11 being generally sector-shaped with the wider edge of the sector at the rear of the plate with respect to the direction A, said wider edge being located at a distance behind the rearmost extremity of the frame portion 1 with respect to the same direction. Substantially horizontally aligned stub shafts 12 are carried by the two plates 11 close to the upper leading corners thereof and corresponding arms 13 are turnable upwardly and downwardly alongside the neighboring plates 11 about the axis defined by the stub shafts 12. The arms 13 extend generally rearwardly from the stub shafts 12 with respect to the direction A and project some distance rearwardly beyond the rear edges of the plates 11. Each plate 11 is formed, close to its rearmost edge, with a curved row of holes 15 that are all equidistant from the axis defined by the stub shafts 12 and the corresponding arm 13 is formed with a single hole that is at the same distance from said axis, thus enabling it to be brought into register with any chosen one of the corresponding row of holes 15. Locking bolts or the like 14 are provided for entry through the holes in the arms 13 and chosen holes 15 in the corresponding rows to maintain said arms 13 in corresponding angular positions about the axis defined by the stub shafts 12.

The rear portions of the arms 13 that extend rearwardly beyond the plates 11 are bent over downwardly by a few degrees and have a supporting member that is in the form of an open ground roller 16 rotatably mounted between them by substantially aligned horizontal bearings. The roller 16 comprises a central axially disposed support or carrier 17 of tubular construction to which is fastened, at regular intervals therealong, a plurality, such as eight, of circular support plates 18 whose general planes are all vertically or substantially vertically disposed in parallel relationship whith one another and substantially parallel relationship with the direction A. Each support plate 18 is formed, close to its outer peripheral edge, with a plurality (such as 16) of holes that are spaced apart from one another at regular angular intervals around the axis of the central support or carrier 17. A plurality of elongate elements that may be of tubular construction, as illustrated, or of solid rod-like formation, are entered lengthwise through the holes in the successive support plates 18 and are preferably wound helically around the longitudinal axis of the central tubular support or carrier 17 as illustrated in FIG. 1 of the drawings for two of the elements 19. FIG. 2 of the drawings shows that it is not necessary that each hole in each support plate 18 should co-operate with one of the elements 19, the roller 16 being illustrated as being furnished with only eight of the elements 19 that are thus entered through every second hole around the periphery of each support plate 18. Generally speaking, the number of elements 19 that should be provided, and their arrangement in the roller 16, is dictated by the particular operating conditions under which the implement is to be used.

The front of the hollow frame portion 1 with respect to the direction A is provided, midway across the width thereof, with a coupling member or trestle 20 that is of generally triangular configuration as seen in either front or rear elevation. The coupling member or trestle 20 is constructed for connection to the three-point lifting device or hitch of an agricultural tractor or other operating vehicle in the generally known manner that is illustrated in outline in FIGS. 1 and 2 of the drawings and it will be noted that downwardly and rearwardly, with respect to the direction A, divergent strengthening tie beams or struts 21 rigidly but releasably interconnect substantially the apex of the coupling member or trestle 20 and two widely space apart locations at the top and rear of the hollow frame portion 1.

The soil cultivating implement which has so far been described is provided with attachment means which comprises a carrier structure that is generally indicated by the reference 22, said carrier structure 22 being connected to the implement in an upwardly and downwardly pivotable manner so that another tool or implement, such as a seed drill 23, can be used in combination with the soil cultivating implement in a satisfactory manner which does not unduly load the frame portion of said implement. The carrier structure 22 comprises two horizontally or substantially horizontally disposed frame beams 24 that are forwardly convergent in the direction A as seen in plan view (FIG. 1), the leading ends of said beams 24 being provided with parallel and substantially vertically disposed coupling plates 25. The two coupling plates 25 are formed with substantially horizontally aligned holes and pivot bolts 26 or the like are entered through those holes and through similarly aligned holes in rear portions of vertical plates 27 provided at substantially the foot of the coupling member or trestle 20. When the plates 25 are coupled to the plates 27 by the pivot bolts 26 or the like, the carrier structure 22 is turnable upwardly and downwardly relative to the frame portion 1 of the soil cultivating implement about the substantially horizontal axis that is defined by those pivot bolts 26 or the like, said axis being perpendicular or substantially perpendicular to the direction A and being located very close to the front of the hollow frame portion 1 as seen in the plan view of FIG. 1 of the drawings.

A tie beam 28 interconnects the two frame beams 24 of the carrier structure 22, its opposite ends making junctions with said beams 24 at locations which are disposed short distances forwardly of the midpoints of those beams with respect to the direction A. The rearmost ends of the two frame beams 24 are secured to corresponding vertically or substantially vertically disposed frame beams 29 at points which are close to the lowermost ends of those beams 29. Two substantially horizontal tie beams 30 and 31 interconnect the two vertical or substantially vertical frame beams 29, the lower tie beam 30 being located at the same level as the two frame beams 24 and the upper tie beam 31 being located close to the upper ends of the two beams 29. The lower and upper tie beams 30 and 31 are in substantially parallel relationship with one another and with the tie beam 28. Two upwardly and rearwardly, with respect to the direction A, divergent strip-shaped supports 32 interconnect substantially the midpoint of the tie beam 28 and two horizontally spaced apart locations on the upper rear tie beam 31.

The two vertical or substantially vertical frame beams 29 are hollow and their lowermost ends are provided with substantially vertical bearings in which corresponding substantially vertical shafts that are not visible in the drawings are freely turnable. The lowermost end of each shaft projects from beneath the bottom of the corresponding beam 29 and is there rigidly secured to the web or base of a corresponding forked bracket 33 whose parallel limbs project downwardly towards the ground surface in directions which will normally be inclined rearwardly, as illustrated, with respect to the direction A. The lowermost ends of the oblique limbs of the forked brackets 33 are perpendicularly interconnected by axle shafts 34 and corresponding ground wheels 35 are rotatably mounted on those axle shafts between the two limbs of the corresponding forked brackets 33. It will be evident that, with this arrangement, each ground wheel 35 is a castor ground wheel whose plane of rotation is freely angularly displaceable about an axis substantially coinciding with the vertical or substantially vertical longitudinal axis of the corresponding frame beam 29.

Two parallel and substantially vertical plates 36 interconnect the lower and upper tie beams 30 and 31 at two locations which are spaced inwardly by equal distances from the opposite ends of those tie beams. The leading edges of the plates 36 with respect to the direction A are inclined downwardly and forwardly from top to bottom with respect to said direction A. Lower leading corners of the substantially vertical plates 36 are provided with substantially horizontally aligned stub shafts 37 about which rearwardly projecting arms 38 are upwardly and downwardly turnable, said arms 38 passing rearwardly from the stub shafts 37 beneath the lower tie beam 30. Substantially midway along its length, each arm 38 is pivotally connected by a substantially horizontal pivot pin 41 to a fork at the lower end of a corresponding carrier arm 39 whose length is adjustable in a manner that is well known per se and that will be evident from an inspection of FIG. 2 of the drawings. The upper ends of the carrier arms 39 are turnably connected by further pivot pins, that are parallel to the pivot pins 41, to forked brackets 40 that project substantially horizontally rearwardly from the corresponding plates 36 at a level which is a little below that of the upper tie beam 31. In addition to being adjustable in length, the two carrier arms 39 are also adjustable relative to the arms 38 as regards the positions of their pivotal connections thereto by way of the pins 41. Each arm 38 is formed with a plurality of transverse holes 42 that are spaced apart from one another lengthwise along the arm and the pivot pin 41 concerned can be entered through horizontally aligned holes in the fork at the lower end of the corresponding carrier arm 39 and through a chosen intervening hole 42 in the arm 38. The pivot pins 41 may be in the form of pivot bolts or may be arranged to be releasably retained in their appointed positions in any other convenient manner that is known per se. FIGS. 1 and 3 of the drawings illustrate the fact that the forks at the lower ends of the two carrier arms 39 are farther apart from one another than are the upper ends of those arms which are pivotally connected to the forked brackets 40 so that the longitudinal axes of the carrier arms 39 are in upwardly convergent relationship.

The rear of a central region of the upper tie beam 31 is provided, midway, between the locations at which the two strip-shaped supports 32 are secured to that tie beam, with a pair of parallel and vertically disposed coupling plates 43 that are formed with a plurality of pairs of horizontally aligned holes 44. The two plates 43 both extend parallel or substantially parallel to the direction A and are intended for the connection thereto of the upper adjustable-length lifting link 46 of a three-point coupling member of the tool or implement that is to be used in combination with the soil cultivating implement, said tool or implement being, in this case, the aforementioned seed drill 23. The three-point coupling member of the seed drill 23 also comprises a pair of horizontally spaced apart but vertically disposed plates (FIG. 1) that are perpendicularly interconnected by a rigid substantially horizontal shaft 45 which projects by short distance beyond the relatively remote sides of the two vertical plates of the coupling member. The opposite projecting ends of the shaft 45 are entered pivotally through bearing holes at the rearmost ends of the two arms 38 and thus constitute the two lower coupling points of the three-point coupling member of the seed drill 23. It will be apparent that the particular construction of the three-point coupling member of the seed drill 23 is by no means essential and that the coupling plates 43 and arms 38 could co-operate equally well with three-point coupling members of somewhat different constructions. For example, the shaft 45 could be replaced by a pair of substantially horizontally aligned stub shafts. The leading end of the upper lifting link 46, or its equivalent, co-operates pivotally with whichever pair of the holes 44 in the coupling plates 43 that is most convenient having regard to the particular construction of the three-point coupling member.

In the use of the soil cultivating implement that has been described in combination with the seed drill 23, the coupling member or trestle 20 is connected to the three-point lifting device or hitch at the rear of an agricultural tractor or other operating vehicle in the generally known manner that is illustrated in FIGS. 1 and 2 of the drawings and the forwardly projecting splined or otherwise keyed end of the rotary input shaft 9 is placed in driven connection with the power take-off shaft of the same tractor or other vehicle by way of the known telescopic transmission shaft 10 which has universal joints at its opposite ends. Before work commences, the maximum depth to which the tines 5 of the rotary soil working or cultivating members 3 can penetrate into the soil is set by adjusting the axis of rotation of the roller 16 to an appropriate level relative to that of the hollow frame portion 1. This adjustment is carried out by turning the arms 13 upwardly, or downwardly, as may be required about the stub shafts 12, retaining the selected position of adjustment by entering the locking bolts or the like 14 in appropriate holes 15. In addition, the speed at which the members 3 will revolve in response to a more or less constant input speed of rotation applied to the leading end of the input shaft 9 is determined by an appropriate adjustment of the change-speed gear 8 in the manner briefly discussed above. These adjustments are made in the light of the nature and condition of the soil that is to be cultivated and the particular purpose for which that soil is intended after treatment. As the implement moves forwardly over the ground in the direction A, the 12 rotary soil working or cultivating members 3 work overlapping strips of soil to produce a single broad strip of worked land, each member revolving in a direction which is opposite to the direction of rotation of its immediate neighbor or both of its immediate neighbors. With the preferred spacing of substantially 25 centimeters between the axes of rotation of the shafts 2, the implement that has been described by way of example will have a working width of substantially 3 meters.

In order to connect the seed drill 23, or an alternative implement or tool such as a fertilizer distributor, to the soil cultivating implement for use in combination therewith, the carrier structure 22 is pivotally connected to the two plates 27 using the coupling plates 25 at the leading ends of the frame beams 24 and the removable pivot bolts or the like 26. The carrier structure 22 is sustained from the ground surface by the two castor ground wheels 35 and the three-point coupling member of the seed drill 23 or other tool or implement is connected to the coupling plates 43 and to the arms 38 in the illustrated manner that has been described above. The arms 38 and coupling plates 43 that afford the three coupling points of the carrier structure 22 are located between the two castor ground wheels 35 as seen in plan (FIG. 1) and considered in the direction A (FIG. 3). As the combination moves forwardly in the direction A, the carrier structure 22 can turn upwardly and downwardly relative to the soil cultivating implement about the axis defined by the pivot bolts or the like 26 to match undulations in the ground surface that may be met with and it will be appreciated that, if the seed drill 23 or other tool or implement does not have its own ground wheels or other supporting member or members, most of its weight will be sustained from the ground surface by the castor ground wheels 35 of the carrier structure 22. This ensures that the seed drill 23 or other attached tool or implement places very little, if any, load upon the frame portion 1 of the soil cultivating implement. As previously discussed, the coupling points of the carrier structure 22 can match three-point coupling members of several different kinds that are likely to be encountered in the use of various tools and implements that may be employed in combination with the soil cultivating implement. Firstly, the upper coupling plates 43 are provided with a plurality of pairs of holes 44 some of which (although not illustrated) may be of different sizes to the others, secondly, the arms 38 can be turned upwardly and downwardly about the axis defined by the stub shafts 37 by decreasing or increasing the lengths of the carrier arms 39 and, thirdly, the positions of the pivot pins 41 that connect the carrier arms 39 to the arms 38 can be changed.

When the combination is to be transported from one place to another without performing any working operation, the three-point lifting device or hitch of the agricultural tractor or other operating vehicle to which the coupling member or trestle is connected is raised to bring the soil cultivating implement clear of contact with the ground. The carrier structure 22 will then turn downwardly about the axis defined by the pivot bolts or the like 26 relative to the soil cultivating implement but it will be seen from FIG. 2 of the drawings that the vertical spacing between the top of the roller 16 and the bottoms of the substantially centrally overlying frame beams 24 is such that this downward turning movement of the carrier structure 22 will not be sufficient for the frame beams 24 to come into contact with the top of the roller 16. The carrier structure 22 itself remains in contact with the ground by way of the castor wheels 35 and the attached seed drill 23 or other tool or implement either remains in contact with the ground by way of its own ground wheels, when those are provided, or may be maintained clear of the ground surface, deriving its support from the castor ground wheels 35. In this latter case, some adjustment of the length of the upper lifting link 46 and/or of the lengths of the carrier arms 39 may be necessary to ensure adequate ground clearance.

The construction that has been desceibed above with reference to the accompanying drawings enables a tool or implement, such as a seed drill or fertiliser distributor, to be attached to a soil cultivating implement in a very simple manner for use in combination with that implement. The attached tool or implement remains capable of following undulations in the surface of the ground independently of the soil cultivating implement and does not exert any undue load upon the frame of that implement.

Although certain features of the soil cultivating implement and carrier structure that have been described and/or that are illustrated in the accompanying drawings will be set forth in the following claims as inventive features, it is emphasized that the invention is not necessarily limited to those features and that it includes within its scope each of the parts of the soil cultivating implement and carrier structure that has been described, and/or that is illustrated in the accompanying drawings, both individually and in various combinations.

What we claim is:

1. A soil cultivating implement comprising an elongated transverse frame portion and soil working means supported on said frame portion, a fixed three-point front coupling adjacent the forward side of said frame portion being connectable to a prime mover, a further implement carrier structure being interconnected to said three-point coupling by linkage means, forward portions of said linkage means being pivotably connected to the lower part of said three-point coupling, said linkage means being pivotable about spaced apart and substantially horizontal axes that extend transverse to the direction of travel and said linkage means extending above the frame portion from the carrier structure, said structure comprising a pair of substantially vertical frame beams that are interconnected with an upper tie beam and a lower tie beam, plate means secured to said upper tie beam, said plate means extending downwardly, below said lower tie beams and rearwardly extending arms being pivoted to the lower portion of said plate means, bracket means fixed to said plate means above said arms and adjustable carrier arms interconnecting the rearwardly extending arms to said bracket means, a coupling plate member secured to said upper tie beam, said plate member and rearwardly extending arms forming a three-point coupling that is connectable to a cooperating coupling member of a further implement.

2. A soil cultivating implement comprising an elongated transverse frame portion and soil working means supported on said frame portion, a fixed three-point coupling adjacent the forward side of said frame portion being connectable to a prime mover, a supporting roller being connected to said frame portion and located to the rear of said soil working means, said roller being upwardly and downwardly adjustable in level relative to said frame portion, a further implement carrier being pivotably interconnected by linkage means to said three-point coupling, said linkage means being connected to the lower part of said three-point coupling and pivotable about spaced apart, substantially horizontal axes that extend transverse to the direction of travel, said axes being located in advance of said soil working means and said structure comprising spaced apart, substantially vertical frame beams that are interconnected to one another with transverse tie beam means, forwardly extending beams of said linkage means pivotally interconnecting the vertical frame beams with the lower part of said three-point coupling, the midpoints of said forwardly extending frame beams being located substantially vertically above said roller, each of said vertical frame beams being supported on a respective ground wheel, and a rear coupling on said carrier being positioned to interconnect a further implement to said first mentioned implement.

3. An implement as claimed in claim 2, wherein the forwardly extending frame beams are pivoted to respective coupling plates that are linked to the lower two points of said fixed coupling.

4. An implement as claimed in claim 2, wherein said vertical frame beams are connected to one another by spaced apart rear tie beams that extend transverse to the direction of travel.

5. An implement as claimed in claim 4, wherein said rear coupling is mounted on said rear tie beams and a lower rear tie beam interconnects said forwardly convergent beams.

6. An implement as claimed in claim 2, wherein said forwardly extending beams include two frame beams that forwardly converge.

7. An implement as claimed in claim 2, wherein said rear coupling has three coupling points for connection to a three-point coupling member of the further implement.

8. An implement as claimed in claim 7, wherein two coupling points of the rear coupling comprise pivotably mounted arms that are located at substantially the same horizontal level for connection to lower couplings of said three-point coupling member, a third coupling point being located substantially centrally above said arms for connection to an upper coupling of said coupling member.

9. An implement as claimed in claim 8, wherein said arms are pivoted to said structure in front of said ground wheels.

* * * * *